(12) United States Patent
Hauguel et al.

(10) Patent No.: US 11,780,783 B2
(45) Date of Patent: Oct. 10, 2023

(54) ACCELERATOR POWDER AND QUICK-SETTING BINDER COMPOSITION

(71) Applicant: SIKA TECHNOLOGY AG, Baar (CH)

(72) Inventors: Lolita Hauguel, Zürich (CH); Maxime Liard, Zürich (CH); Didier Lootens, Küssnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/838,730

(22) Filed: Jun. 13, 2022

(65) Prior Publication Data

US 2022/0332653 A1 Oct. 20, 2022

Related U.S. Application Data

(62) Division of application No. 16/964,879, filed as application No. PCT/EP2019/051414 on Jan. 22, 2019, now Pat. No. 11,565,978.

(30) Foreign Application Priority Data

Jan. 24, 2018 (EP) .................................. 18153321

(51) Int. Cl.
| | | |
|---|---|---|
| *C04B 40/00* | (2006.01) | |
| *C04B 22/06* | (2006.01) | |
| *C04B 22/08* | (2006.01) | |
| *C04B 22/10* | (2006.01) | |
| *C04B 24/12* | (2006.01) | |
| *C04B 24/16* | (2006.01) | |
| *C04B 28/04* | (2006.01) | |
| *C04B 103/12* | (2006.01) | |
| *C04B 103/20* | (2006.01) | |
| *C04B 103/30* | (2006.01) | |

(52) U.S. Cl.
CPC .......... *C04B 40/0042* (2013.01); *C04B 22/06* (2013.01); *C04B 22/085* (2013.01); *C04B 22/10* (2013.01); *C04B 24/122* (2013.01); *C04B 24/16* (2013.01); *C04B 28/04* (2013.01); *C04B 2103/12* (2013.01); *C04B 2103/20* (2013.01); *C04B 2103/30* (2013.01)

(58) Field of Classification Search
CPC ... C04B 40/0042; C04B 22/06; C04B 22/085; C04B 22/10; C04B 24/122; C04B 24/16; C04B 28/04; C04B 2103/12; C04B 2103/20; C04B 2103/30; C04B 2103/10; C04B 14/06; C04B 14/28; C04B 22/008; C04B 22/12; C04B 22/122; C04B 22/16; C04B 24/06; C04B 24/2647; C04B 2103/22; Y02W 30/91
See application file for complete search history.

(56) References Cited

U.S. PATENT DOCUMENTS

| | | |
|---|---|---|
| 4,060,425 A | 11/1977 | Harada et al. |
| 6,451,105 B1 | 9/2002 | Turpin, Jr. |
| 8,366,825 B2 | 2/2013 | Sabio et al. |
| 8,476,341 B2 | 7/2013 | Sakamoto et al. |
| 2010/0072294 A1 | 3/2010 | Nakashima et al. |

FOREIGN PATENT DOCUMENTS

| | | | | |
|---|---|---|---|---|
| CN | 101708971 A | | 5/2010 | |
| CN | 101792279 A | | 8/2010 | |
| CN | 103466986 A | | 12/2013 | |
| CN | 104987009 A | * | 10/2015 | ............. C04B 28/04 |
| CN | 106220105 A | * | 12/2016 | ............. C04B 28/06 |
| CN | 106277907 A | | 1/2017 | |
| CN | 107032649 A | | 8/2017 | |
| CN | 107285655 A | | 10/2017 | |
| CN | 107337406 A | * | 11/2017 | ............. C04B 28/04 |
| CN | 108793809 A | | 11/2018 | |
| DE | 4 106 380 A1 | | 9/1991 | |
| EP | 0 670 292 A1 | | 9/1995 | |
| EP | 2085368 A2 | * | 8/2009 | ............. C04B 14/04 |
| EP | 2228352 A1 | * | 9/2010 | ............. C04B 14/06 |
| JP | H06-144902 A | | 5/1994 | |
| KR | 10-2014-0059884 A | | 5/2014 | |
| KR | 20140059884 A | | 5/2014 | |
| KR | 10-2015-0086638 A | | 7/2015 | |
| RU | 2527436 C2 | | 8/2014 | |

OTHER PUBLICATIONS

Mar. 27, 2019 International Search Report issued in International Patent Application No. PCT/EP2019/051414.
Jul. 28, 2020 International Preliminary Report on Patentability issued in International Patent Application No. PCT/EP2019/051414.
RU 2527436 C2 machine translation via EspaceNet. (Year: 2014).
Derwent Acc No. 2014-V93717, abstract of Brazil Patent Specification No. BR 201001123 A2 (Sep. 2014) (Year: 2014).
Jeong, Yeonung et al., "Effect of Calcium Carbonate Fineness on Calcium Sulfoaluminate-Belite Cement," Materials, vol. 10, 900, 2017, pp. 1-18.

* cited by examiner

*Primary Examiner* — Anthony J Green
(74) *Attorney, Agent, or Firm* — Oliff PLC

(57) ABSTRACT

An accelerator powder for cement and also rapid-setting binder compositions which contain the accelerator powder and the use in mortar or concrete. The accelerator powder includes from 10 to 99.7% by weight of a water-insoluble mineral powder P and from 0.3 to 90% by weight of at least one compound V selected from the group consisting of alkali metal halides and alkaline earth metal halides, alkali metal nitrates and alkaline earth metal nitrates, alkali metal nitrites and alkaline earth metal nitrites, alkali metal thiocyanates and alkaline earth metal thiocyanates and hydroxyalkylamines or salts thereof, and mixtures thereof.

12 Claims, No Drawings

ACCELERATOR POWDER AND QUICK-SETTING BINDER COMPOSITION

This is a Divisional of U.S. application Ser. No. 16/964,879, filed Jul. 24, 2020, now U.S. Pat. 11,565,978, which in turn is a National Phase of PCT/EP2019/051414, filed Jan. 22, 2019, which claims the benefit of EP 18153321.7, filed Jan. 24, 2018. The disclosure of the prior applications is hereby incorporated by reference herein in its entirety.

TECHNICAL FIELD

The invention relates to an accelerator powder for cement, compositions containing the accelerator powder, the use of the accelerator powder in concrete or mortar mixtures and also shaped bodies obtained therefrom.

PRIOR ART

Cement is a mineral binder and is used in large amounts for concrete and mortar. If cement is mixed with water, it cures in a chemical process, namely cement hydration. In cement hydration, also referred to as setting of the cement, cement hydrates are formed. These function as binders for the aggregates, usually sand, gravel and stones, in the concrete and mortar, resulting in a strong shaped body being formed. Cement hydration is an exothermic process whose strength-developing reaction typically commences only with a delay, often only a number of hours after mixing of the cement with water.

For many applications of mortar or concrete, rapid setting and rapid strength acquisition are very important, since this saves time, which saves money. Novel processing techniques, for example 3D printing, also require mortar or concrete which rapidly attains strength.

There are various methods for accelerating cement hydration. An increase in the temperature accelerates setting and is used, for example, in finished part works by heating of formwork elements, aggregates and mixing water. However, this technique can be used only to a limited extent outside finished part works and costs energy. An increase in the temperature without sufficient after-treatment can lead to severe drying and thus insufficient hydration of the cement.

The use of specialty cements such as calcium aluminate cement or calcium sulfoaluminate cement gives mortar or concrete which cures rapidly but has disadvantages in respect of durability. These specialty cements are often used in combination with accelerators based on lithium salts. However, calcium aluminate cement, calcium sulfoaluminate cement and lithium salts are expensive and not obtainable in large amounts over the whole world.

U.S. Pat. No. 8,366,825 describes a rapid-curing binder based on cement, calcium nitrite, a formaldehyde derivative and a superplasticizer. The mortars and concretes produced therewith display good processability over at least 90 minutes, and strength development therefore sets in at the earliest after 90 minutes.

EP 0 670 292 describes a mixture of a nitrate and/or sulfite component, an alkanolamine component, a thiocyanate component and a carboxylic acid component as setting and curing accelerator. Commencement of setting in the examples disclosed is not less than 2 hours and the end of setting is not less than 3 hours.

U.S. Pat. No. 6,451,105 describes the use of fine limestone powder as accelerator for compositions containing Portland cement. The commencement of setting of the mortar mixtures disclosed which contain the accelerator is in the range from 3 to 6 hours.

The solutions up to the present do not meet the requirement for a rapid commencement of setting, in particular less than 90 minutes, and a rapid end of setting, in particular less than 3 hours, of the cement-based composition. There is therefore still a need for an inexpensive, readily obtainable accelerator for cement by means of which a rapid commencement of setting and a rapid strength development are achieved.

BRIEF DESCRIPTION OF THE INVENTION

It is an object of the invention to provide a nontoxic, inexpensive and commercially readily available accelerator for cement, by means of which a rapid commencement of setting and a rapid strength development are achieved.

This object is surprisingly achieved by an accelerator as described in claim 1.

If the accelerator powder is mixed with cement, this gives a binder composition which after mixing with water sets rapidly and quickly attains good strengths. The accelerator powder and the mixture of the accelerator powder with cement can be mixed simply and homogeneously with the further constituents of a mortar or concrete and be used very well in finished dry mortar or dry concrete mixtures.

Concrete or mortars containing the accelerator powder of the invention set rapidly to very rapidly after mixing with water and attain good strength after a short time. As a result, elements can be removed from formwork at an early juncture, floors can be walked on soon and coatings can be applied without long delay times. In formwork-free concrete or mortar construction, for instance 3D printing, the applied layers very rapidly attain sufficient strength to be self-supporting and can also support further layers. This is of great importance for rapid and economical printing.

Concrete, mortar and cement paste containing the accelerator powder for accelerating setting display significantly reduced shrinkage compared to accelerators of the prior art, which is very advantageous since shrinkage often leads to formation of cracks.

The constituents of the accelerator powder are inexpensive, commercially available worldwide and simple to mix. The accelerator can be stored very well as powder and can also be stored for a long time without problems after blending with cement.

Further aspects of the invention are subject matter of further independent claims. Particularly preferred embodiments of the invention are subject matter of the dependent claims.

WAYS OF CARRYING OUT THE INVENTION

The invention provides an accelerator powder for cement, comprising:
  from 10 to 99.7% by weight of a water-insoluble mineral powder P and
  from 0.3 to 90% by weight of at least one compound V selected from the group consisting of alkali metal halides and alkaline earth metal halides, alkali metal nitrates and alkaline earth metal nitrates, alkali metal nitrites and alkaline earth metal nitrites, alkali metal thiocyanates and alkaline earth metal thiocyanates and hydroxyalkylamines or salts thereof, and mixtures thereof.

In the present document, the term "particle size" refers to the diameter of a solid particle. The particle size is here generally determined in the case of relatively large particles, in particular greater than about 0.1 mm, by means of sieve analysis and in the case of relatively small particles, in particular smaller than about 0.1 mm, by means of laser light scattering.

In the present document, the term "average particle size D50" refers to the value of the particle size at which 50% by weight of the particles are smaller than the value indicated.

In the present document, a "water-insoluble powder" is a pulverulent material which dissolves in deionized water to an extent of not more than 1 gram per liter after stirring for 1 hour at 20° C.

In the present document, a "cement-based composition" is a composition which contains cement or consists thereof. In particular, the cement-based composition contains at least 5% by weight of cement, with a maximum of 100% by weight. Examples of a cement-based composition are a cement paste, a mortar and a concrete.

Surprisingly, the combination of the compounds V with the powder P brings about significantly greater acceleration of setting and/or of strength development of a cement-based composition than the compounds V alone or the powder P alone.

The amount of the compound V added to accelerate a cement-based composition can be significantly reduced by the combination with the powder P, which is economically and ecologically desirable.

The combination of the compound V with the powder P makes it possible to achieve surprisingly rapid to very rapid setting of the cement-based composition, even within a few minutes.

Likewise surprisingly, cement-based compositions which contain the accelerator powder display significantly lower shrinkage, especially within the first 24 hours, than cement-based compositions without the accelerator powder.

A reduction in shrinkage is advantageous because fewer cracks are formed as a result.

The mineral powder P is preferably crystalline. Such powders are particularly effective in the mixture with the compound V.

The mineral powder P is preferably selected from the group consisting of calcium carbonate, dolomite, metakaolin and quartz flour, preferably from among calcium carbonate and dolomite.

These powders are obtainable in different particle sizes and are simple and safe to handle.

It can also be advantageous to use mixtures of these powders.

In particular, mineral powder P comprises calcium carbonate or dolomite or consists largely thereof.

Calcium carbonate powder can, for example, be obtained by milling of limestone, chalk or marble and can, depending on the origin of the raw material, additionally contain other mineral materials as impurities.

The calcium carbonate powder typically comprises at least 90% by weight of calcium carbonate.

Dolomite powder can, for example, be obtained by milling of dolomite or dolomitic limestone.

The dolomite powder typically comprises at least 90% by weight of dolomite or dolomitic limestone.

It is advantageous for at least 50% by weight, preferably at least 70% by weight, in particular 100% by weight, of the powder P to be calcium carbonate or dolomite.

In particular, the mineral powder P has an average particle size D50 of from 1 to 150 µm, preferably from 1.5 to 130 µm.

Mineral powders P having an average particle size of from 1.1 to 50 µm, in particular from 1.2 to 15 µm, preferably from 1.3 to 10 µm, or from 1.4 to 8 µm, are particularly advantageous.

The mineral powder P advantageously comprises not more than 40% by weight, preferably not more than 20% by weight, in particular not more than 10% by weight, especially not more than 5% by weight, of particles which are larger than 150 µm, preferably larger than 100 µm.

If the powder P contains an excessively large proportion of relative large particles, the effect of the accelerator powder is significantly smaller.

The powder P advantageously contains not more than 30% by weight of particles which are smaller than 1 µm and/or not more than 20% by weight, in particular 10% by weight, of particles which are smaller than 0.5 µm.

In particular, the powder P is not a nanopowder, i.e. the proportion of particles smaller than 1 µm is not more than 10% by weight.

If the proportion of very fine particles in the powder P is too high, the processability of a cement-based mixture after mixing with water is impaired. Such mixtures generally require more water than those without these very small particles. More water has an adverse effect on the strength development and the final strengths of the concrete or mortar. In addition, many nanopowders are harmful to health.

The compound V advantageously comprises an alkali metal nitrate or alkaline earth metal nitrate, in particular sodium nitrate, an alkali metal thiocyanate or alkaline earth metal thiocyanate, in particular sodium thiocyanate, or a hydroxyalkylamine, or mixtures thereof.

The hydroxyalkylamine is preferably diethanolamine, triethanolamine, N-methyldiethanolamine, N-ethyldiethanolamine, tris(hydroxymethyl)amino-methane, diisopropanolamine, triisopropanolamine, methyldiisopropanolamine, or a salt thereof.

The compound V advantageously comprises at least one hydroxyalkylamine, in particular diethanolamine, triethanolamine or N-methyldiethanolamine, preferably N-methyldiethanolamine.

In particular, the compound V comprises at least 10% by weight of a hydroxyalkylamine, based on the total weight of the compound V.

This brings about, in particular, a rapid commencement of setting and in addition rapid strength development of the cement-based composition.

A rapid commencement of setting and a rapid end of setting are especially advantageous, in particular in the case of a mortar for 3D printing.

In addition, the reduction in shrinkage is especially pronounced when the accelerator powder comprises at least one hydroxyalkylamine, especially N-methyldiethanolamine, as compound V.

The hydroxyalkylamine has preferably been partially or completely neutralized with an inorganic or organic acid.

In particular, the acid is an organic acid, preferably formic acid, acetic acid, citric acid, lactic acid, tartaric acid or gluconic acid.

This is advantageous for simple and safe production and storage of the accelerator and a possibly unpleasant odor of the accelerator powder can be decreased.

In a preferred embodiment, the accelerator powder comprises at least two, in particular at least three, different compounds V selected from the group consisting of alkali metal halides and alkaline earth metal halides, alkali metal nitrates and alkaline earth metal nitrates, alkali metal nitrites and alkaline earth metal nitrites, alkali metal thiocyanates and alkaline earth metal thiocyanates and hydroxyalkylamines, or salts thereof.

The at least two compounds V are advantageously
an alkali metal nitrate or alkaline earth metal nitrate and a hydroxyalkylamine,
an alkali metal nitrate or alkaline earth metal nitrate and an alkali metal thiocyanate or alkaline earth metal thiocyanate, or
an alkali metal thiocyanate or alkaline earth metal thiocyanate and a hydroxyalkylamine.

The combination of at least three compounds V, in particular of an alkali metal nitrate or alkaline earth metal nitrate, an alkali metal thiocyanate or alkaline earth metal thiocyanate and a hydroxyalkylamine, is especially advantageous.

The combination of the powder P with two or three compounds V displays a surprisingly strong accelerating effect on the setting of cements, even at a small added amount of the compound V.

The accelerator powder advantageously comprises from 50 to 99.7% by weight, preferably from 75 to 99.5% by weight, in particular from 80 to 99% by weight, of powder P and from 0.3 to 50% by weight, preferably from 0.5 to 25% by weight, in particular from 1 to 20% by weight, of at least one compound V, based on 100% by weight of the accelerator powder.

Such a ratio of powder P to the sum of the compounds V gives good acceleration at low costs.

It is advantageous for an effective plasticizer to be added simultaneously with the accelerator powder to the cement-based composition. In particular, the plasticizer is present in the accelerator powder.

Suitable plasticizers are the plasticizers customary in mortar and concrete technology. These are known to a person skilled in the art.

Especially suitable plasticizers are polycarboxylate ethers. In particular, the polycarboxylate ether is a comb polymer comprising a polycarboxylate backbone with polyalkylene oxide side chains, in particular polyethylene oxide side chains, bound thereto. The side chains are, in particular, bound via ester, ether, imide and/or amide groups to the polycarboxylate backbone. Such comb polymers are also supplied commercially by Sika Schweiz AG under the trade name series Sika® ViscoCrete®.

The accelerator powder preferably also comprises a plasticizer, in particular a polycarboxylate ether, preferably in an amount of from 0.3 to 10% by weight, in particular from 0.4 to 8% by weight, especially from 0.5 to 7% by weight, calculated as dry plasticizer and based on 100% by weight of accelerator powder.

This gives good processability of the cement-based composition with a rapid commencement of setting and rapid strength development.

The accelerator powder advantageously also comprises a retarder, preferably a hydroxycarboxylic acid, in particular tartaric acid, citric acid or gluconic acid, or a salt thereof, a sugar, in particular sucrose, a phosphate or a phosphonate, or a salt thereof, or mixtures thereof.

A particularly preferred retarder is tartaric acid or an alkali metal salt thereof. In particular, the accelerator powder comprises from 0.1 to 10% by weight, preferably from 0.5 to 8% by weight, more preferably from 0.8 to 7% by weight, of a retarder, based on 100% by weight of the accelerator powder.

The retarder can, if it is an acid, be particularly advantageously used for the complete or partial neutralization of the hydroxyalkylamine.

The addition of a retarder to the accelerator powder enables the commencement of setting of the cement-based composition to be controlled in a targeted manner. In this way, the time window for processing and the strength development of the cement-based composition can be set for the desired application. This makes a wide range of uses for the accelerator powder possible.

In particular, a time window for processing can as a result be set in the range from, for example, 5 minutes to 60 minutes while nevertheless achieving rapid strength development.

An advantageous accelerator powder has the following composition:
100 parts by weight of mineral powder, in particular calcium carbonate, having an average particle size D50 in the range from 1 to 150 μm,
from 0 to 20, in particular from 1 to 10, parts by weight of sodium nitrate,
from 0 to 20, in particular from 1 to 10, parts by weight of sodium thiocyanate,
from 0.1 to 5, in particular from 1.0 to 2, parts by weight of N-methyldiethanolamine,
from 0 to 10, in particular from 0.8 to 7, parts by weight of retarder, in particular tartaric acid, and
from 0 to 10, in particular from 1 to 7, parts by weight of polycarboxylate plasticizer,
where the sum of calcium nitrate, sodium thiocyanate and N-methyl-diethanolamine is at least 0.3 parts by weight, with all constituents being calculated as water-free components.

Such an accelerator powder brings about a rapid commencement of setting and a rapid end of setting of cement or cement-containing mixtures, in particular of concrete and mortar mixtures.

The use of such an accelerator powder is especially advantageous for accelerating concrete and mortar mixtures for 3D printing.

The accelerator is preferably present as free-flowing powder. This can be mixed in a simple way with cement or cement-containing mixtures.

The accelerator powder is advantageously produced by mixing of the components.

In particular, a component which is possibly present in liquid form, for instance the hydroxyalkylamine or an aqueous solution of the plasticizer, is sprayed onto the mineral powder P. Here, the mineral powder P can be mixed with any further powder components before application of the liquid component or only thereafter. Suitable methods for mixing powders or mixing powders with liquids are known to a person skilled in the art. Water or solvent introduced can optionally be removed from the powder by means of suitable methods.

However, it can also be advantageous for the accelerator powder to be processed with water to give an aqueous suspension and the latter to be used for accelerating cement-based compositions.

The accelerator suspension can be metered in a simple manner without giving off dust and can be added together with the mixing water or shortly beforehand, or after the mixing water, to a concrete or mortar mixture.

The invention additionally provides a rapid-setting binder composition comprising from 10 to 95% by weight of cement and from 5 to 90% by weight of accelerator powder as described above, based on 100% by weight of binder composition.

The rapid-setting binder composition advantageously comprises from 50 to 94% by weight, preferably from 60 to 92% by weight, in particular from 65 to 90% by weight, of cement and from 6 to 50% by weight, preferably from 8 to 40% by weight, in particular from 10 to 35% by weight, of accelerator powder as described above.

Such a ratio of accelerator powder to cement brings about particularly good acceleration of the setting of the binder composition.

In particular, the cement is a cement in accordance with DIN EN 197-1, in particular Portland cement (CEM I), Portland composite cement (CEM II), blast furnace slag cement (CEM III), pozzolanic cement (CEM IV) and composite cement (CEM V). Of course, cements which are produced according to an alternative standard, for example the ASTM standard, the Japanese standard JIS or the Indian standard, are likewise suitable.

The cement is particularly advantageously Portland cement, preferably a CEM I 42.5 or 52.5, in particular CEM I 52.5.

Such cements are obtainable worldwide in large quantities and at advantageous prices.

The use of a cement of the CEM I type, in particular CEM I 52.5, is particularly advantageous for rapid setting of the binder composition.

In a further advantageous embodiment, the rapid-setting binder composition also comprises from 0.5 to 6% by weight, preferably from 0.8 to 5% by weight, more preferably from 1 to 4% by weight, of calcium sulfate, preferably in the form of calcium sulfate hemihydrate, based on 100% by weight of the rapid-setting binder composition.

The combination of the accelerator powder with calcium sulfate in this amount increases the early strength without influencing the rapid commencement of setting.

In particular, the rapid-setting binder composition is produced by simple homogeneous mixing of the components.

It has surprisingly been found that the binder composition of the invention cures particularly quickly when it is mixed with water, i.e. has a rapid commencement of setting and a rapid end of setting, when the viscosity of the freshly produced aqueous binder composition has a value in the range from 0.8 to 100 Pa·s, preferably from 1 to 50 Pa·s, at a shear rate of $10 \text{ s}^{-1}$.

The viscosity of the binder composition mixed with water is determined here by means of a rheometer model Physica MCR 301 (manufactured by Anton Paar, Austria) using the software Rheoplus. The rheometer is calibrated using a calibration mortar SRM 2493, obtainable from NIST, USA. For the determination of the viscosity, use is made of a steel cup which has inwardly jagged ribs and dimensions of 80 mm in height and 43 mm in diameter and a spindle in the form of a spiral double helix with a height of 50 mm and a diameter of 35 mm.

The viscosity of the rapid-setting binder composition can advantageously be set via the amount of water and/or the content of powder P.

Here, the W/C (the weight ratio of water to cement) is advantageously low, preferably below 0.40, in particular below 0.35, especially below 0.30 or below 0.28.

The invention further provides a concrete or mortar containing the accelerator powder as described above, wherein the accelerator powder is preferably present in an amount of from 6 to 100% by weight, in particular from 8 to 67% by weight, especially from 10 to 54% by weight, based on the weight of the cement present in the concrete or mortar.

The cement in the concrete or mortar is preferably a Portland cement of the CEM I 42.5 or 52.5 type, in particular CEM I 52.5, in accordance with DIN EN 196-1.

The accelerator powder is here mixed into the mortar or concrete.

The concrete or mortar containing the accelerator powder can here be produced, in particular, by mixing the accelerator powder with a dry or aqueous concrete or mortar mixture.

However, the rapid-setting binder composition containing the accelerator powder and cement, as described above, can also be mixed with sand and optionally further additives in order to obtain a rapid-setting concrete or mortar mixture.

In particular, the mineral powder P and the compound V and optionally the plasticizer and/or the retarder can be added in the advantageous amounts directly, without premixing, in the production of a dry mortar or dry concrete.

In a preferred embodiment, the accelerator powder or the rapid-setting binder composition is provided in a premix before it is premixed with the remaining components to give a rapid-setting concrete or mortar. The premixes allow more precise metering of the powder P and the compound V and better mixing of all components. In this way, it is possible to provide a concrete or mortar of high quality which is matched well to the use.

The concrete or mortar can optionally also contain at least one further additive, in particular an antifoam, a wetting agent, a dye, a preservative, a plasticizer, a retarder, further accelerators, a polymer, an air pore former, a rheological auxiliary, a viscosity modifier, a shrinkage reducer or a corrosion inhibitor or combinations thereof.

Such additives are known to a person skilled in the art.

The dry concrete or mortar mixtures containing the accelerator powder have good storage stability and when mixed with water form a rapid-curing concrete or mortar.

An advantageous mortar mixture contains:
- from 55 to 85 parts by weight of sand having a particle size of not more than 4 mm, preferably not more than 2 mm,
- from 15 to 45 parts by weight of cement, in particular CEM I in accordance with DIN EN 197-1, especially CEM I52.5,
- from 5 to 45, in particular from 10 to 25, % by weight of mineral powder P, based on the weight of the cement,
- from 0.15 to 5.0, in particular from 0.3 to 3.0, % by weight of compound V, preferably comprising an alkanolamine, based on the weight of the cement,
- from 0 to 1.0, in particular from 0.1 to 0.8, % by weight of plasticizer, in particular a polycarboxylate ether, based on the weight of the cement,
- from 0 to 1.0, in particular from 0.1 to 0.8, % by weight of retarder, in particular tartaric acid or a salt thereof, based on the weight of the cement, and
- from 0 to 5% by weight of further additives, based on the weight of the cement, with all constituents being calculated as water-free components.

The invention further provides for the use of the accelerator powder for accelerating a concrete or mortar mixture, wherein the concrete or mortar mixture after mixing with water has a commencement of setting of less than 90 minutes, preferably less than 60 minutes, especially less than 30 minutes, and an end of setting of less than 3 hours, preferably less than 2 hours, in particular less than 90 minutes, measured using an automatic Vicat needle apparatus in accordance with DIN EN 196-3 at 20° C.

The accelerator powder is advantageously used for accelerating an aqueous concrete or mortar mixture which has such a composition that the concrete or mortar mixture containing the accelerator powder has a viscosity of from 1 to 100 Pa·s, preferably from 3 to 50 Pa·s, at a shear rate of $10\ s^{-1}$ immediately after mixing with water, where the viscosity is determined on a concrete or mortar sample which has a maximum particle size of 2 mm, in particular obtained by sieving the aqueous concrete or mortar mixture, using a rheometer as described above.

If the viscosity at the shear rate of $10\ s^{-1}$ is below 1 Pa·s, the accelerating effect is lower, but if the viscosity is greater than 100 Pa·s then the concrete or mortar can be processed only with difficulty.

The accelerating effect is surprisingly particularly pronounced when the aqueous concrete or mortar mixture has a viscosity in the preferred range. The viscosity is advantageously set by means of an optimized composition of the concrete or mortar.

In particular, the viscosity can be set by means of the amount of water, the amount and fineness of the powder P and also the amount and type of the cement.

In particular, it is advantageous for the amount of water to be small and the concrete or mortar nevertheless to be readily processable. This can, in particular, be brought about by the use of the fluidizer. The fluidizer is advantageously already integrated into the accelerator powder.

The W/C of the concrete or mortar mixture is preferably below 0.45, more preferably below 0.43, in particular below 0.40, especially 0.39 or below. Such mortars and concretes set particularly rapidly when they contain the accelerator powder.

Concretes and mortars whose setting is accelerated by means of the accelerator powder surprisingly display significantly lower shrinkages, especially within the first 24 hours, than concrete and mortar without the accelerator powder.

A reduction in the shrinkage is advantageous because it results in the prescribed dimensions remaining largely unchanged in the cured shaped body and fewer cracks being formed.

The reduction in the shrinkage is especially pronounced when the accelerator powder comprises at least one hydroxyalkylamine, especially N-methyldiethanolamine, as compound V.

The use of the accelerator powder for rapid-curing mortars, in particular for an embedding mortar, a repair mortar, a screed, in particular for a floor, a tile mortar, a watertight mortar or a mortar for 3D printing, is particularly advantageous.

The use of the accelerator powder for mortars for 3D printing is especially advantageous.

3D printing is a formwork-free shaping process in which the mortar is applied in a plurality of layers located on top of one another and if required also next to one another or in relatively small portions so as to form a three-dimensional object. The buildup here is carried out under computer control according to prescribed measurements and shapes. It is particularly important in 3D printing that the freshly applied mortar rapidly gains strength so that the next layer or portion can be applied on top at an early juncture. Only in this way can the shaped body be manufactured rapidly and economically.

It is advantageous in 3D printing for the commencement of setting to be in the range from 1 to 30 minutes, in particular from 2 to 16 minutes. It is likewise advantageous for the end of setting to be less than 90 minutes, in particular less than 40 minutes. This ensures sufficient time for application and at the same time a fast manufacturing speed.

The invention further relates to a shaped body produced from a concrete or mortar mixture containing the accelerator powder as described above after mixing with water and curing of the mixture obtained in this way.

EXAMPLES

Working examples which are intended to illustrate the invention described in more detail are set forth below. Of course, the invention is not restricted to these working examples described.

1. Materials Used

Omyalite® 90 is a fine calcium carbonate powder having an average particle size D50 of 1.5 μm, obtainable from Omya, Switzerland. Nekafill® 15 is a fine calcium carbonate powder obtainable from Kalkfabrik Netstal, Switzerland.

Sika® ViscoCrete®: pulverulent high-performance plasticizer Sika® ViscoCrete®-225 P based on modified polycarboxylate, obtainable from Sika Deutschland GmbH.

RW füller is an uncompacted microsilica (amorphous $SiO_2$) obtainable from RW silicium GmbH, Germany.

2. Composition and Production of the Accelerator Powders and Binder compositions Accelerator Powder B1 (Comparative Mixture)
0.8 g of sodium nitrate and 0.2 g of sodium thiocyanate were mixed.

Accelerator Powder B2 (Comparative Mixture)
1.0 g of sodium nitrate and 1.0 g of sodium thiocyanate were mixed.

Accelerator Powder B3 (Comparative Mixture)
0.25 g of sodium nitrate, 0.14 g of sodium thiocyanate, 0.11 g of N-methyldiethanolamine and 0.7 g of Sika® ViscoCrete®-225 P were mixed.

Accelerator Powder B4 (According to the Invention)
10 g of Omyalite® 90 were mixed with 0.2 g of N-methyldiethanolamine. Accelerator powder B5 (According to the Invention) 10 g of Omyalite® 90 were mixed with 1.0 g of sodium nitrate and 0.2 g of N-methyldiethanolamine.

Accelerator Powder B6 (According to the Invention)
10 g of Omyalite® 90 were mixed with 0.25 g of sodium nitrate, 0.14 g of sodium thiocyanate, 0.11 g of N-methyldiethanolamine and 0.7 g of Sika® ViscoCrete®-225 P.

Accelerator Powder B7 (According to the Invention)
10 g of Nekafill® 15 were mixed with 0.25 g of sodium nitrate, 0.14 g of sodium thiocyanate, 0.11 g of N-methyldiethanolamine and 0.7 g of Sika® ViscoCrete®-225 P.

Accelerator Powder B8 (According to the Invention)
10 g of Omyalite® 90 were mixed with 0.2 g of sodium nitrate, 0.13 g of sodium thiocyanate, 0.1 g of N-methyldiethanolamine and 0.2 g of Sika® ViscoCrete®-225 P.

Accelerator Powder B9 (According to the Invention)
20 g of Omyalite® 90 were mixed with 0.2 g of sodium nitrate and 0.8 g of sodium thiocyanate.

Accelerator Powder B10 (According to the Invention)
10 g of Omyalite® 90 were mixed with 1.0 g of sodium nitrate, 0.2 g of sodium thiocyanate and 0.1 g of N-methyldiethanolamine.

Accelerator Powder B11 (According to the Invention)
5 g of RW füller were mixed with 1.0 g of sodium nitrate, 0.2 g of sodium thiocyanate and 0.1 g of N-methyldiethanolamine.

Accelerator Powder B12 (According to the Invention)

10 g of Omyalite® 90 were mixed with 1.0 g of sodium nitrate, 0.2 g of sodium thiocyanate, 0.1 g of N-methyldiethanolamine and 0.05 g of tartaric acid.

Accelerator Powder B13 (According to the Invention)

10 g of Omyalite® 90 were mixed with 1.0 g of sodium nitrate, 0.2 g of sodium thiocyanate and 0.1 g of triethanolamine.

Rapid-Setting Binder Composition M1 (According to the Invention)

90 g of cement (CEM I 52.5) were mixed with 10.63 g of accelerator powder B8.

Rapid-Setting Binder Compositions M2 and M3 (According to the Invention)

M2 and M3 were produced like M1 but 0.2 g of tartaric acid in the case of M2 and 0.4 g of tartaric acid in the case of M3 were added to the accelerator powder B8. Correspondingly, 10.83 g of accelerator powder in the case of M2 and 11.03 g of accelerator powder in the case of M3 were mixed with 90 g of cement.

3. Use Tests

The commencement of setting and the end of setting were determined by means of an automatic Vicat needle apparatus in accordance with DIN EN 196-3, at 20° C.

The setting time is for the purposes of this document the time interval between the end of mixing and the commencement or end of setting.

The compressive strength was determined on test specimens having dimensions of 40×40×160 mm in accordance with DIN EN 196-1. The test specimens were stored covered in the mold at 20° C. until testing was carried out.

3.1 Testing of the Accelerator Powders in Cement Paste

The cement and the accelerator powder were mixed for 30 seconds in a mixer (KitchenAid model ARTISAN, 5KSM150). The water in which the fluidizer had been dissolved was subsequently added and the cement paste was mixed for a further 3 minutes.

The composition of the cement pastes and the setting times measured and also compressive strengths after 2 hours are reported in Table 1 and Table 2.

TABLE 1

| | T1* | T2* | T3* | T4* | T5 | T6 | T7 |
|---|---|---|---|---|---|---|---|
| Cement CEM I 52.5 R (g) | 100 | 90 | 100 | 100 | 90 | 90 | 80 |
| Accelerator powder | — | Omyalite ® 90 | B1 | B2 | B4 | B5 | B9 |
| Amount (g) | — | 10.0 | 1.0 | 2.0 | 10.2 | 11.2 | 21.0 |
| Sika ® ViscoCrete ® (g) | 0.2 | 0.2 | 0.2 | 0.2 | 0.2 | 0.2 | 0.2 |
| Water (g) | 23 | 23 | 23 | 23 | 23 | 23 | 23 |

TABLE 1-continued

| | T1* | T2* | T3* | T4* | T5 | T6 | T7 |
|---|---|---|---|---|---|---|---|
| Commencement of setting (h:min) | 8:38 | 4:01 | 3:42 | 3:57 | 0:03 | 0:02 | 2:09 |
| End of setting (h:min) | 10:53 | 6:38 | 7:31 | 7:17 | 0:13 | 0:07 | 5:39 |

*Reference mixture

TABLE 2

| | T8 | T9 | T10 | T11 |
|---|---|---|---|---|
| Cement CEM I 52.5 R (g) | 90 | 95 | 90 | 90 |
| Accelerator powder | B10 | B11 | B12 | B13 |
| Amount (g) | 11.3 | 6.3. | 11.35 | 11.3 |
| Sika ® ViscoCrete ® (g) | 0.2 | 0.2 | 0.2 | 0.2 |
| Water (g) | 23 | 25[1] | 23 | 23 |
| Commencement of setting (h:min) | 0:03 | 0:07 | 0:07 | n.m.[2] |
| End of setting (h:min) | 0:07 | 0:10 | 0:11 | n.m. |
| Compressive strength after 2 hours (MPa) | 10.4 | 8.5 | 10.7 | n.m |

[1] In order to be able to process the cement paste, 25 g of water rather than 23 g of water had to be added.
[2] n.m: not measurable; setting commences during mixing.

3.2 Testing of the Rapid-Setting Binder Compositions M1 to M3

The binder compositions M1, M2 and M3 were mixed in the amounts indicated in Table 2 with water in a mixer (KitchenAid model ARTISAN, 5KSM150) for 3 minutes. Commencement of setting and end of setting of the mixtures were subsequently determined. The values found are reported in Table 3.

TABLE 3

| | T12 | T13 | T14 |
|---|---|---|---|
| Binder composition | M1 | M2 | M3 |
| Amount (g) | 100.63 | 100.83 | 101.03 |
| Water (g) | 22.5 | 22.5 | 22.5 |
| Commencement of setting (h:min) | 0:11 | 0:18 | 0:41 |
| End of setting (h:min) | 0:16 | 0:36 | 1:26 |

3.3 Testing of the Accelerator Powders in a Mortar Mixture

The cement was homogeneously mixed with the accelerator powder in a mixer (KitchenAid model ARTISAN, 5KSM150). The sand and the water were subsequently added and the mortar was mixed again for 3 minutes. The composition of the mortars and the setting times measured are reported in Table 4.

TABLE 4

| | T15* | T16* | T17* | T18* | T19 | T20 |
|---|---|---|---|---|---|---|
| Sand 0.08/2 mm (g) | 300 | 300 | 300 | 300 | 300 | 300 |
| Cement CEM I 52.5 (g) | 100 | 100 | 100 | 100 | 100 | 100 |
| Accelerator powder | — | B3 | Omyalite ® 90 | Nekafill ® 15 | B6 | B7 |

TABLE 4-continued

|  | T15* | T16* | T17* | T18* | T19 | T20 |
|---|---|---|---|---|---|---|
| Amount (g) | — | 1.2 | 10 | 10 | 11.2 | 11.2 |
| Sika ® ViscoCrete ® (g) | 0.5 | — | 0.7 | 0.7 | — | — |
| Water (g) | 39 | 39 | 39 | 39 | 39 | 39 |
| Commencement of setting (h:min) | 5:49 | 4:09 | 5:40 | 7:10 | 0:12 | 0:13 |
| End of setting (h:min) | 8:39 | 6:58 | 7:34 | 9:27 | 0:44 | 1:17 |

*Reference mixture

The invention claimed is:

1. A mortar mixture comprising:
   from 55 to 85 parts by weight of sand having a particle size of not more than 4 mm,
   from 15 to 45 parts by weight of cement,
   from 5 to 45% by weight of mineral powder P, based on the weight of the cement, the mineral powder P having an average particle size in a range of from 1.1 to 8 μm,
   from 0.15 to 5.0% by weight of at least two different compounds V, based on the weight of the cement, the at least two different compounds V including a first compound V that is a hydroxyalkylamine or a salt thereof, wherein any further compounds V are selected from the group consisting of an alkali metal halide, an alkaline earth metal halide, an alkali metal nitrate, an alkaline earth metal nitrate, an alkali metal nitrite, an alkaline earth metal nitrite, an alkali metal thiocyanate, and an alkaline earth metal thiocyanate,
   from 0 to 1.0% by weight of plasticizer, based on the weight of the cement,
   from 0 to 1.0% by weight of retarder, based on the weight of the cement, and
   from 0 to 5% by weight of further additives, based on the weight of the cement,
   with all constituents being calculated as water-free components.

2. The mortar mixture according to claim 1, wherein the retarder is present in an amount in a range of from 0.1 to 0.8 w %, based on the weight of the cement.

3. The mortar mixture according to claim 1, wherein the mineral powder P is selected from the group consisting of calcium carbonate, dolomite, metakaolin and quartz flour.

4. The mortar mixture according to claim 1, wherein the hydroxyalkylamine has been partially or completely neutralized with an inorganic or organic acid.

5. The mortar mixture according to claim 1, wherein the retarder includes a hydroxycarboxylic acid.

6. The mortar mixture according to claim 1, wherein the retarder includes at least one selected from the group consisting of tartaric acid, citric acid, gluconic acid, and a salt thereof.

7. The mortar mixture according to claim 6, wherein the retarder includes tartaric acid or a salt thereof.

8. The mortar mixture according to claim 1, wherein the further additives include at least one selected from the group consisting of an antifoam, a wetting agent, a dye, a preservative, a plasticizer, a retarder, a polymer, an air pore former, a rheological auxiliary, a viscosity modifier, a shrinkage reducer, and a combination thereof.

9. A method of producing a shaped body comprising:
   mixing the mortar mixture according to claim 1 with water to form an aqueous mixture and curing the aqueous mixture to form the shaped body.

10. The method according to claim 9, wherein, after mixing the mortar mixture with water, the aqueous mixture has a commencement of setting of less than 90 minutes and an end of setting of less than 3 hours, measured using an automatic Vicat needle apparatus in accordance with DIN EN 196-3 at 20° C.

11. The method according to claim 9, wherein, after mixing the mortar mixture with water, the aqueous mixture has a viscosity in a range of from 1 to 100 Pa's at a shear rate of $10$ $s^{-1}$, where the viscosity is determined on a mortar sample which has a maximum particle size of 2 mm, using a rheometer.

12. A shaped body produced from the mortar mixture according to claim 1 after mixing with water and curing the resulting mixture.

* * * * *